US008876471B2

(12) United States Patent
Morris et al.

(10) Patent No.: US 8,876,471 B2
(45) Date of Patent: Nov. 4, 2014

(54) TURBINE STATOR AIRFOILS WITH INDIVIDUAL ORIENTATIONS

(71) Applicant: Honeywell International Inc., Morristown, NJ (US)

(72) Inventors: Mark C. Morris, Phoenix, AZ (US); Harry Lester Kington, Scottsdale, AZ (US); James Neumann, Tempe, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/887,801

(22) Filed: May 6, 2013

(65) Prior Publication Data

US 2013/0216368 A1 Aug. 22, 2013

Related U.S. Application Data

(62) Division of application No. 12/500,453, filed on Jul. 9, 2009, now Pat. No. 8,434,543.

(51) Int. Cl.
*F01D 9/04* (2006.01)
*F01D 9/00* (2006.01)
*F01D 5/28* (2006.01)

(52) U.S. Cl.
CPC ............ *F01D 9/00* (2013.01); *F05D 2300/606* (2013.01); *Y02T 50/673* (2013.01); *F01D 5/284* (2013.01); *F01D 9/041* (2013.01)
USPC .......................... 415/200; 415/210.1; 148/404

(58) Field of Classification Search
USPC ................ 415/191, 200, 208.1, 208.2, 209.2, 415/209.3, 209.4, 210.1; 416/189–192, 416/193 R, 193 A, 241 R; 148/404
See application file for complete search history.

(56) References Cited

U.S. PATENT DOCUMENTS

| | | | |
|---|---|---|---|
| 3,572,419 A | 3/1971 | Barrow et al. | |
| 4,170,256 A | 10/1979 | Blazek et al. | |
| 5,062,468 A | 11/1991 | Monte et al. | |
| 5,275,228 A | 1/1994 | Wortmann et al. | |
| 5,611,670 A | 3/1997 | Yoshinari et al. | |
| 5,813,832 A * | 9/1998 | Rasch et al. | 415/200 |
| 5,868,194 A | 2/1999 | Horwood | |
| 6,331,217 B1 | 12/2001 | Burke et al. | |
| 6,331,361 B1 | 12/2001 | Esch et al. | |
| 6,709,771 B2 | 3/2004 | Allister | |
| 6,969,240 B2 | 11/2005 | Strangman | |
| 2002/0157250 A1 | 10/2002 | Haendler et al. | |
| 2005/0025613 A1 * | 2/2005 | Strangman | 415/1 |

* cited by examiner

*Primary Examiner* — Christopher Verdier
(74) *Attorney, Agent, or Firm* — Ingrassia Fisher & Lorenz, P.C.

(57) ABSTRACT

In accordance with an exemplary embodiment, a turbine stator component includes a first endwall; a second endwall; a first stator airfoil coupled between the first and second endwalls; and a second stator airfoil adjacent to the first airfoil and coupled between the first and second endwalls. The first stator airfoil has first crystallographic primary and secondary orientations. The second stator airfoil has second crystallographic primary and secondary orientations, the first crystallographic primary and secondary orientations being different from the second crystallographic primary and secondary orientations.

12 Claims, 9 Drawing Sheets

TURBINE STATOR AIRFOILS WITH INDIVIDUAL ORIENTATIONS

PRIORITY CLAIM

This is a divisional of U.S. application Ser. No. 12/500,453, (now U.S. Pat. No. 8,434,542), filed Jul. 9, 2009.

TECHNICAL FIELD

The present invention generally relates to turbine engines, and more particularly relates to turbine engines with stator airfoil components.

BACKGROUND

Gas turbine engines are generally known in the art and used in a wide range of applications, such as propulsion engines and auxiliary power unit engines for aircraft. In a typical configuration, a turbine engine includes rows of stator airfoils and rotor blades disposed in an alternating sequence along the axial length of a generally annular hot gas flow path. The rotor blades are mounted on the periphery of rotor disks coupled to a main engine shaft. The stator airfoils are coupled to inner and outer endwalls and optimally direct hot combustion gases to the rotor blades, thus resulting in rotary driving of the rotor disks to provide an engine output.

The stator airfoils and rotor blades typically have arcuate shapes with generally concave pressure sides and generally convex suction sides extending axially in chords between opposite leading and trailing edges. During operation, the aerodynamic contours of the stator airfoils and rotor blades, and corresponding flow passages therebetween, are configured in an attempt to maximize energy extraction from the combustion gases. The complex three-dimensional (3D) configuration of the stator airfoils and rotor blades results in varied temperature and pressure distributions over the surfaces of the stator airfoils and rotor blades. These distributions exacerbate design and operation issues, particularly at higher temperatures. From the viewpoint of efficiency, it is desirable to operate the turbine at temperatures as high as possible. However, at these high temperatures, some conventional engines may have problems, particularly durability issues.

Accordingly, it is desirable to provide improved turbine components and manufacturing methods that enable operation at higher temperatures and/or improved durability. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine stator component includes a first endwall; a second endwall; a first stator airfoil coupled between the first and second endwalls; and a second stator airfoil adjacent to the first airfoil and coupled between the first and second endwalls. The first stator airfoil has first crystallographic primary and secondary orientations. The second stator airfoil has second crystallographic primary and secondary orientations, the first crystallographic primary and secondary orientations being different from the second crystallographic primary and secondary orientations.

In accordance with another exemplary embodiment, a method is provided for designing a turbine component comprising first and second airfoils coupled between first and second endwalls. The method includes the steps of modeling the turbine component; performing transient thermal analysis on the modeled turbine component; applying loads to the modeled turbine component; performing transient stress and deflection analysis on the modeled turbine component; identifying critical locations of the modeled turbine component based on the transient stress and deflection analysis; and fabricating the turbine component based on the modeled turbine component, including orienting crystallographic orientations based on the critical locations.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engine assemblies with turbine stator airfoil components. The turbine stator airfoil component is modeled to determine the critical locations resulting from the associated temperature and stress fields. The crystallographic orientations of each airfoil in the component are optimized to increase capability or durability. Typically, the turbine stator airfoil component includes one or more airfoils, each having unique requirements and resulting crystallographic orientations.

Figure 1:
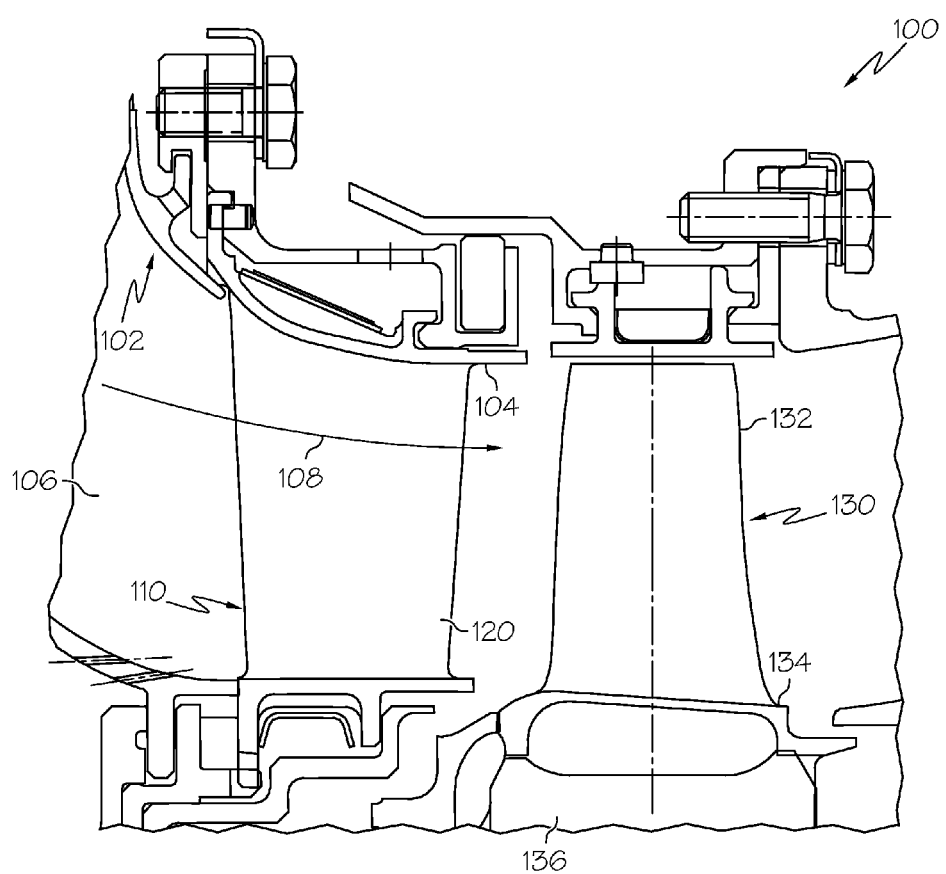
FIG. 1 is a partial cross-sectional view of a gas turbine engine assembly in accordance with an exemplary embodiment.

FIG. 1 is a fragmented vertical sectional view illustrating a portion of a gas turbine engine assembly 100 in accordance with an exemplary embodiment. The gas turbine engine assembly 100 has an overall construction and operation that is generally known to and understood by persons skilled in the art. In general terms, the gas turbine engine assembly 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades 132. The combustion gases 108 flow past axially spaced circumferential rows of stator vanes 120 and rotor blades 132. The rotor blades 132 of the turbine rotor assembly 130 project radially outward from a turbine rotor platform 134 that is coupled to a turbine disk 136, which in turn circumscribes a shaft (not shown). The combustion gases 108 drive the rotor blades 132 and the associated turbine rotor assembly 130 for power extraction. Other embodiments may be differently arranged.

Figure 2:
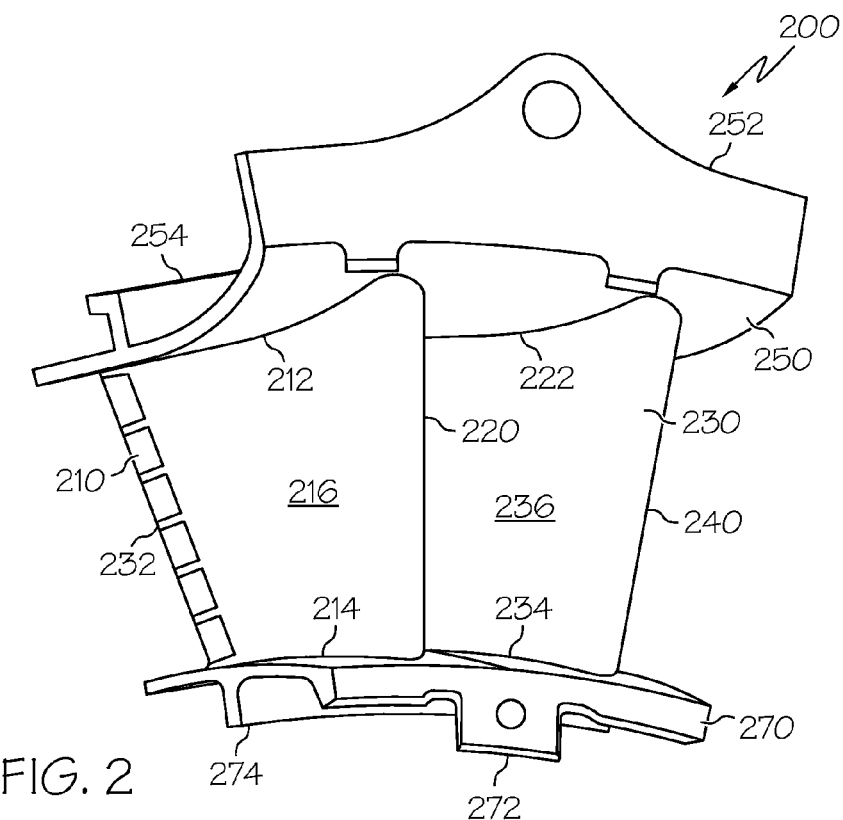
FIG. 2 is a front isometric view of a turbine stator airfoil component in accordance with an exemplary embodiment.
Figure 3:
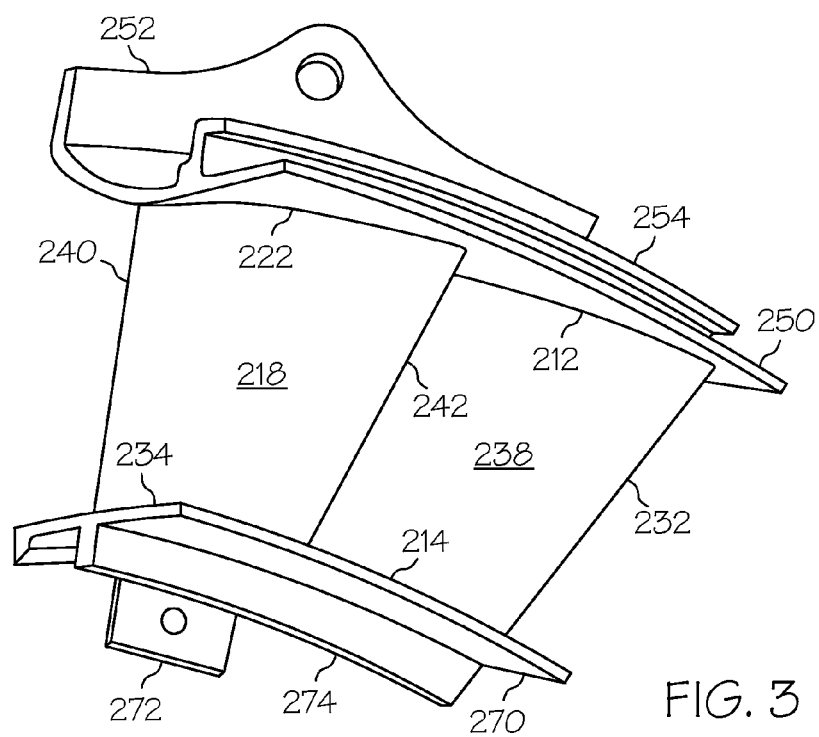
FIG. 3 is a rear isometric view of the turbine stator airfoil component of FIG. 2 in accordance with an exemplary embodiment.

FIG. 2 is a front isometric view of a turbine stator airfoil component 200 in accordance with an exemplary embodiment, and FIG. 3 is a rear isometric view of the turbine stator airfoil component 200 of FIG. 2. Generally, a number of turbine stator airfoil components 200 make up a full ring of the stator assembly 110 (FIG. 1). In the depicted embodiment of FIGS. 2 and 3, the turbine stator airfoil component 200 is manufactured with two stator airfoils 210, 230, which may also referred to as a doublet. In further embodiments, the turbine stator airfoil component 200 can be formed with three, four, five or more stator airfoils. Increasing the number of airfoils in each component 200 may reduce part count and minimize the cooling flow leakage that results at adjacent segment gaps. The component 200 may even be an entire ring of stator airfoils.

The two stator airfoils 210, 230 are coupled at a respective outer edge 212, 222 to a tip endwall 250 and a respective inner edge 214, 234 to a hub endwall 270. The tip endwall 250 includes a forward rail 252 and an aft rail 254 for installation, and the hub endwall 270 similarly includes a forward rail 272 and an aft rail 274. Each stator airfoil 210, 230 includes a generally concave pressure side 216, 236 and a laterally opposite, generally convex suction side 218, 238. Each pressure side 216, 236 and suction side 218, 238 extend from a leading edge 220, 240 to a trailing edge 232, 242.

In one exemplary embodiment, the stator airfoils 210, 230 are manufactured with the endwalls 250, 270 in a single piece, as discussed in further detail below. As the engine operates, each stator airfoil 210, 230 is subject to a different temperature and pressure profile. This results in different stress and strain loads on different portions of the turbine stator airfoil component 200, as also discussed in further detail below.

In accordance with an exemplary embodiment, each stator airfoil 210, 230 can be manufactured with a specified crystallographic orientation to improve durability at increased turbine temperatures. For example, the first stator airfoil 210 and the second airfoil 230 can have different crystallographic orientations to accommodate the asymmetric nature of the temperature profile during operation. Since each stator airfoil 210, 230 has a unique crystallographic orientation, different portions of the endwalls 250, 270 will also have unique crystallographic orientations. In other words, the portions of the endwalls 250, 270 immediately adjacent to the first stator airfoil 210 will have the same crystallographic orientation as the first stator airfoil 210, and the portions of the endwalls immediately adjacent to the second stator airfoil 230 will have the same crystallographic orientations as the second stator airfoil 230. A grain boundary is formed where the different crystallographic orientations meet on the tip endwall 250 and the hub endwall 270. Although the grain boundary may be weaker than the single crystal material, the location of the grain boundaries may also be manipulated to ensure that the grain boundary is not in a high stress area. Additionally, materials with grain boundary strengtheners may also be used to ensure sufficient strength at the grain boundaries. The crystal structure will now be discussed in greater detail.

Figure 4:
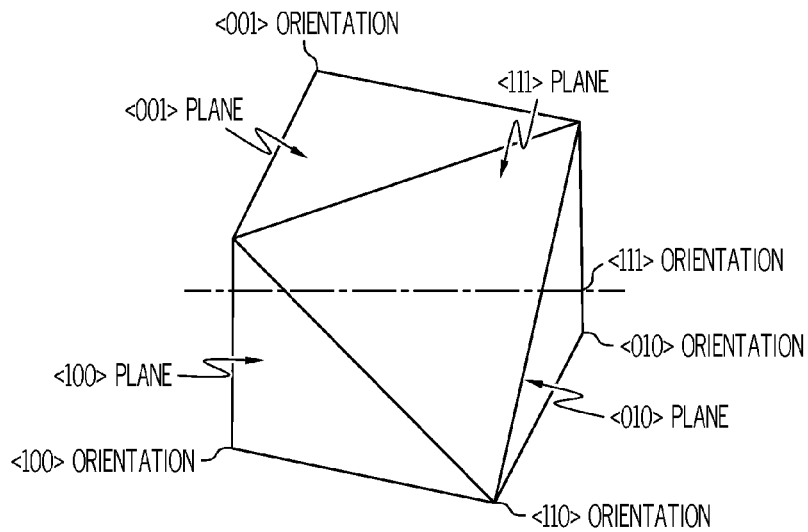
FIG. 4 is a representation of a crystal structure used to manufacture the turbine stator airfoil component of FIGS. 2 and 3.

Generally, the turbine stator airfoil component 200 may be manufactured from a material with the crystal structure as represented in FIG. 4. In this example, the crystal structure is a face center cubic (FCC) structure. Generally, this type of structure can be described with reference to orientations and planes. For example, the <001>, <010>, <100>, <110>, and <111>orientations and <001>, <010>, <100>, <111>planes are shown. The materials used to manufacture the turbine stator airfoil component 200 may have anisotropic properties that exhibit different characteristics in different orientations. These properties can be manipulated to provide an optimized structure for the turbine stator airfoil component 200. For example, crystallographic orientation may impact such things as fatigue strength, creep strength, and mechanical fatigue life of the turbine stator airfoil component 200.

In one exemplary embodiment, the material may be a nickel superalloy, such as, for example, CMSX-486 or SC-180. CMSX-486 is manufactured by the Cannon-Muskegon Corporation of Muskegon, MI. CMSX-486 may be comprised of 61.41 weight percent nickel, 9.3 weight percent cobalt, 5.0 weight percent chromium, 8.6 weight percent tungsten, 4.5 weight percent tantalum, 0.7 weight percent molybdenum, 3.0 percent rhenium, 5.7 weight percent aluminum, 0.7 weight percent titanium, 1.0 weight percent hafnium, 0.07 weight percent carbon, 0.015 weight percent boron, and 0.005 weight percent zirconium.

CMSX-486 may have a Young's modulus that is high in the <111>direction, lower in the <110>direction, and lowest in the <100>, <010>, <001>directions. Thus, the thermal strains in the respective stator airfoil 210, 220 may be reduced by orienting the crystal structure in the direction of a lower Young's modulus. This should provide increased durability in the areas of high thermal strain and provide an enhanced thermal fatigue life for the component 200. For example, if the Young's modulus in the <100>, <010>, and <001>directions is half of that of the <111>direction, orienting a strain area with the <100>, <010>, or <001>direction may increase the thermal fatigue life. As noted above, each stator airfoil 210, 230 may be optimized in such a manner to increase durability.

CMSX-486 additionally includes grain boundary strengtheners to minimize the loss of material strength in off-axis orientations of up to 15°.

Figure 5:
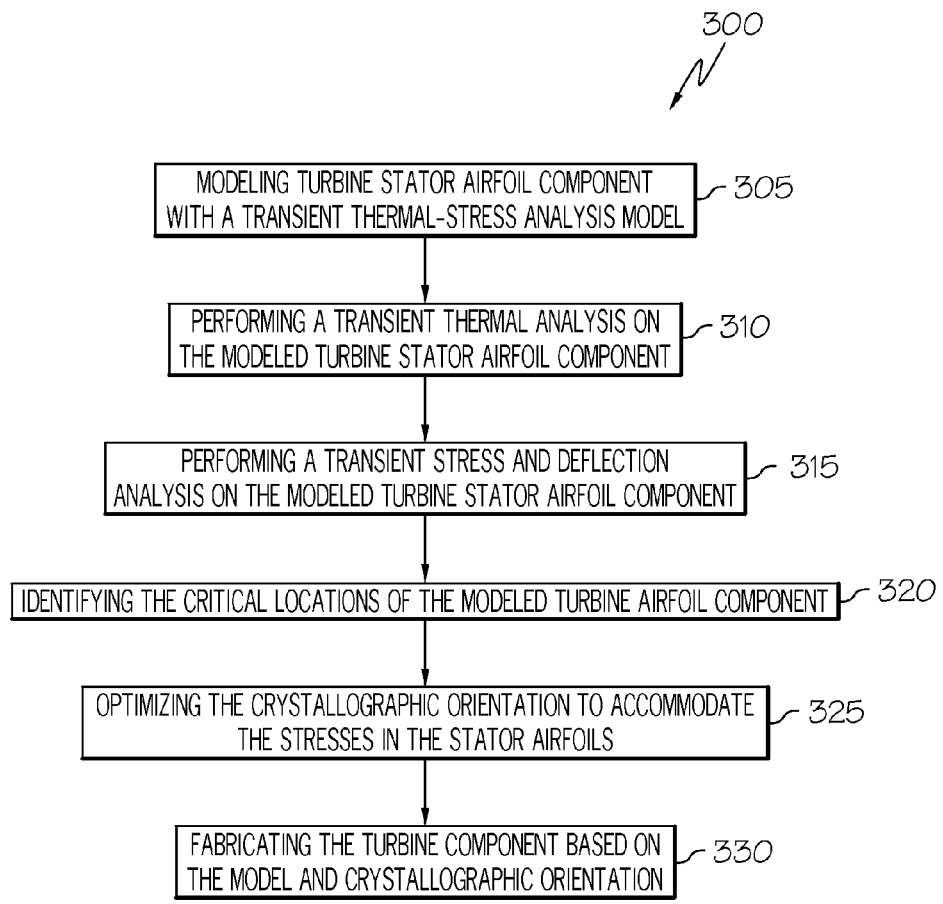
FIG. 5 is a flowchart of a method for manufacturing a turbine stator airfoil component in accordance with an exemplary embodiment.
Figure 6:
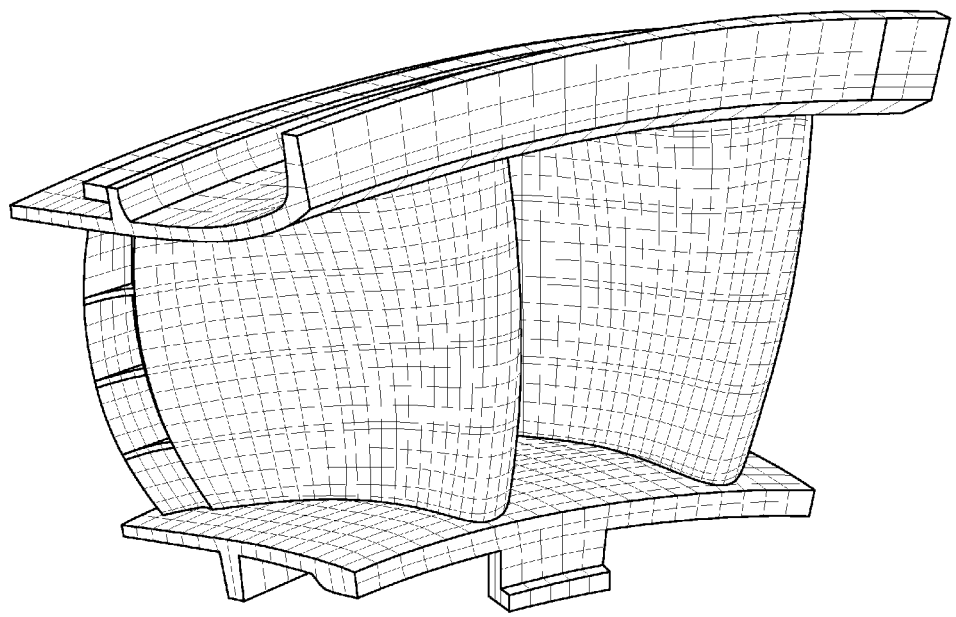
FIG. 6 is a transient thermal-stress analysis model of a turbine stator airfoil component in accordance with an exemplary embodiment.

FIG. 5 is a flowchart of a method 300 for manufacturing a turbine stator airfoil component, such as turbine stator airfoil component 200, in accordance with an exemplary embodiment. In a first step 305, the turbine stator airfoil component 200 is modeled with a transient thermal-stress analysis model. One such model is shown in FIG. 6, which generally represents the turbine stator airfoil component 200 discussed above and illustrates the designated nodes and elements associated with the modeled turbine stator airfoil component 200. As such, FIG. 2 is referenced below.

In a second step 310, a transient thermal analysis is performed on the modeled turbine stator airfoil component 200 and loads are applied. In a third step 315, a transient stress and deflection analysis is performed on the modeled turbine stator airfoil component 200.

Figure 7:
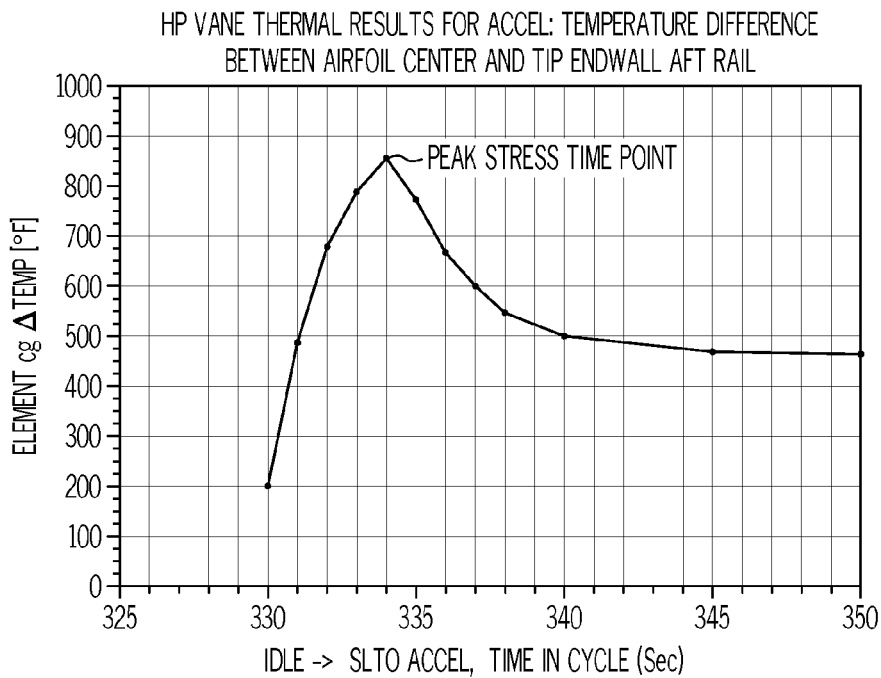
FIG. 7 is a chart showing the transient thermal-stress results for the turbine stator airfoil component model of FIG. 6 during acceleration.
Figure 8:
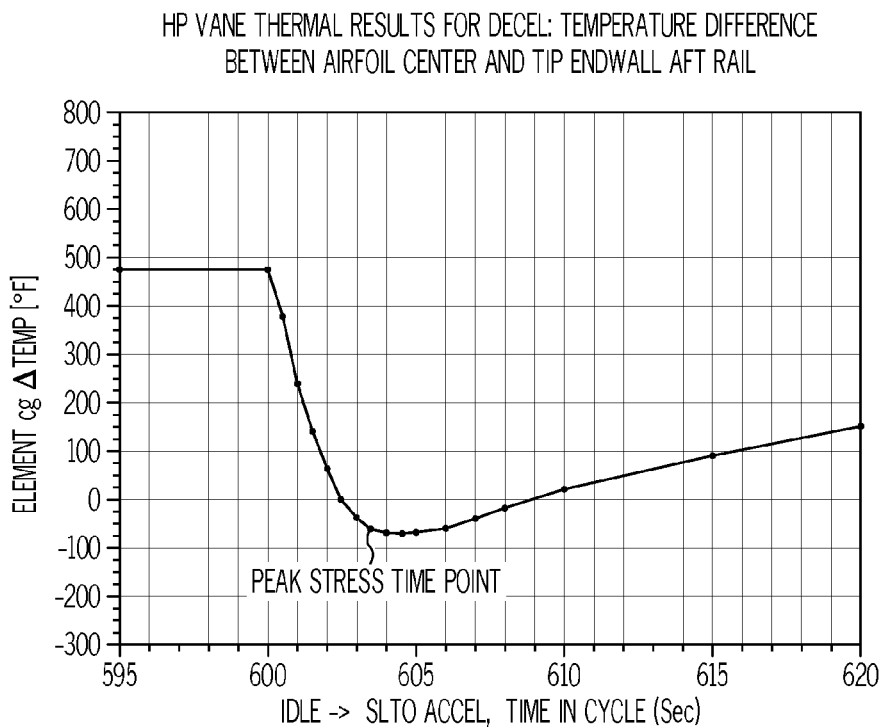
FIG. 8 is a chart showing the transient thermal-stress results for the turbine stator airfoil component model of FIG. 6 during deceleration.

FIG. 7 is a chart showing the transient thermal-stress results for the modeled turbine stator airfoil component 200 of FIG. 6 during acceleration. As shown in FIG. 7, the temperature difference between an airfoil center (e.g., stator airfoil 210 or 230) and the tip endwall aft rail (e.g., tip endwall 250) goes from 200° F. to 850° F. in approximately four seconds. FIG. 8 is a chart showing the transient thermal-stress results for the turbine stator airfoil component model of FIG. 6 during deceleration. As shown in FIG. 8, the temperature difference between an airfoil center (e.g., stator airfoil 210 or 230) and the tip endwall aft rail (e.g., tip endwall 250) goes from 475° F. to −80° F. in less than four seconds. These temperature differences between different areas of the turbine stator airfoil component 200 induce stresses and strains the component. Moreover, because the turbine stator geometry is not symmetric, the resulting stress field is different for each stator airfoil 210, 230.

Figure 9A:
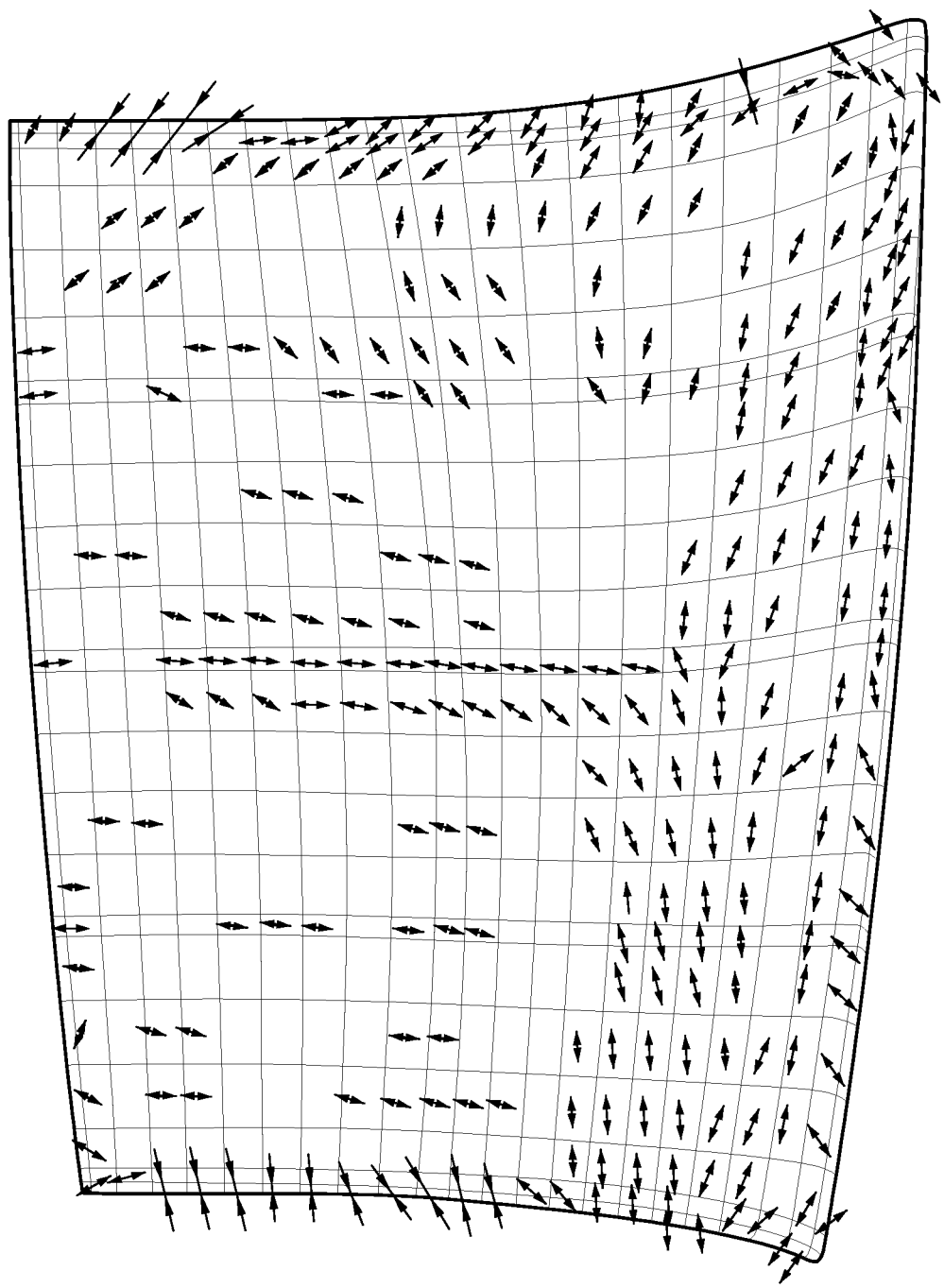
FIGS. 9A and 9B are models showing the principle stresses during the transient thermal-stress analysis for a first stator airfoil of the turbine stator airfoil component during acceleration.
Figure 9B:
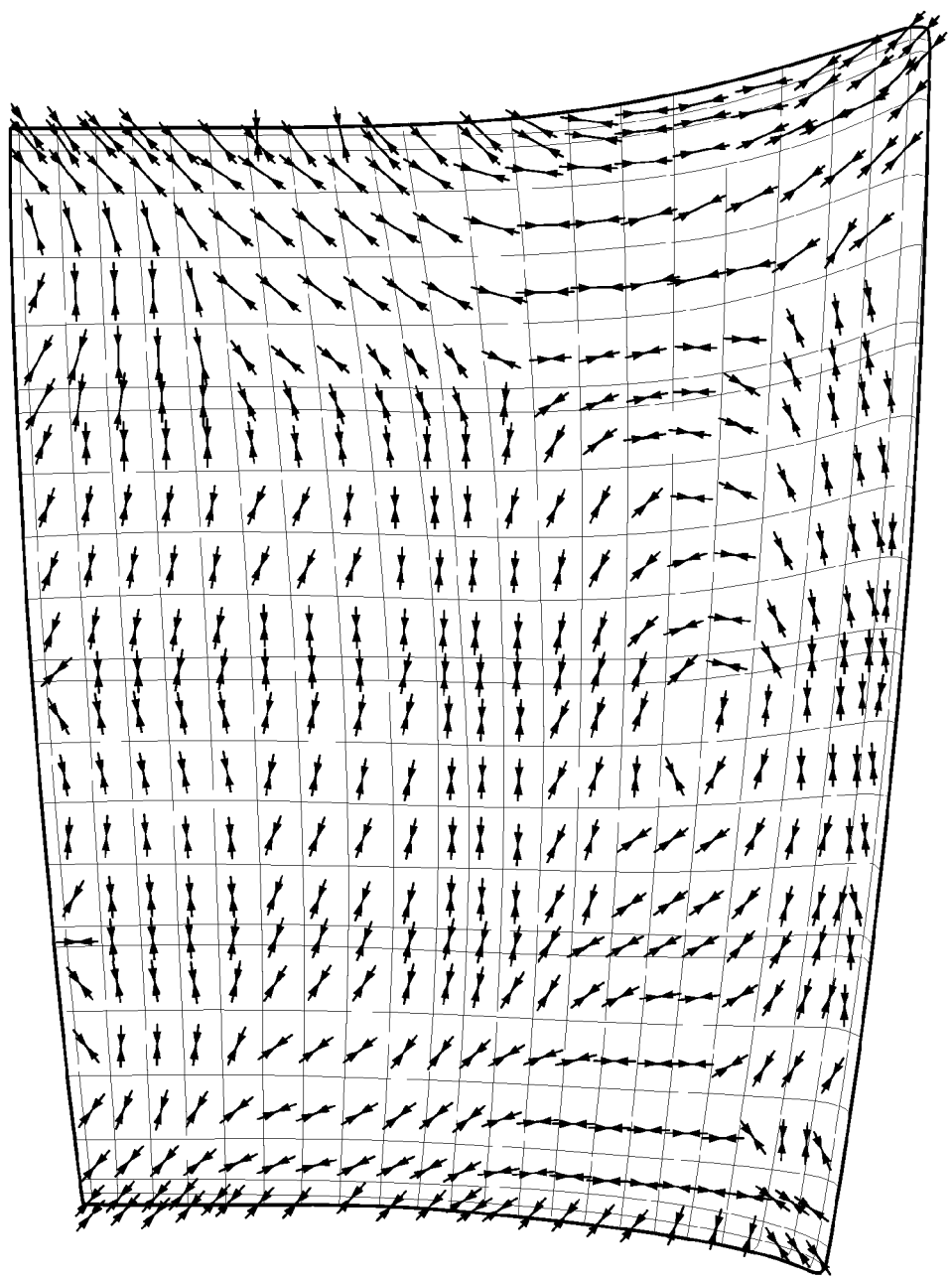
Figure 10A:
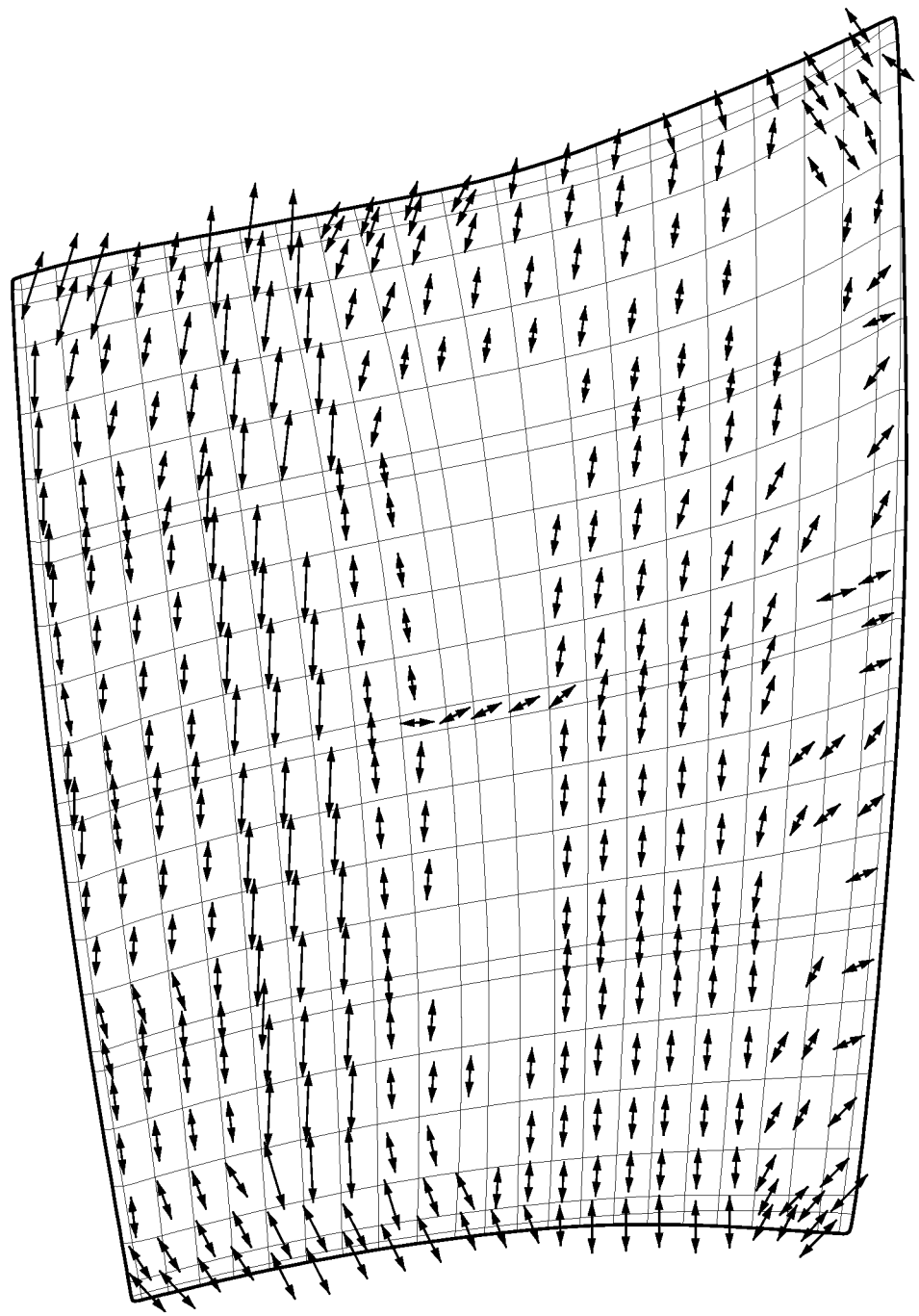
FIGS. 10A and 10B depict models showing the principle stresses during the transient thermal-stress analysis for a second stator airfoil of the turbine stator airfoil component during acceleration.
Figure 10B:
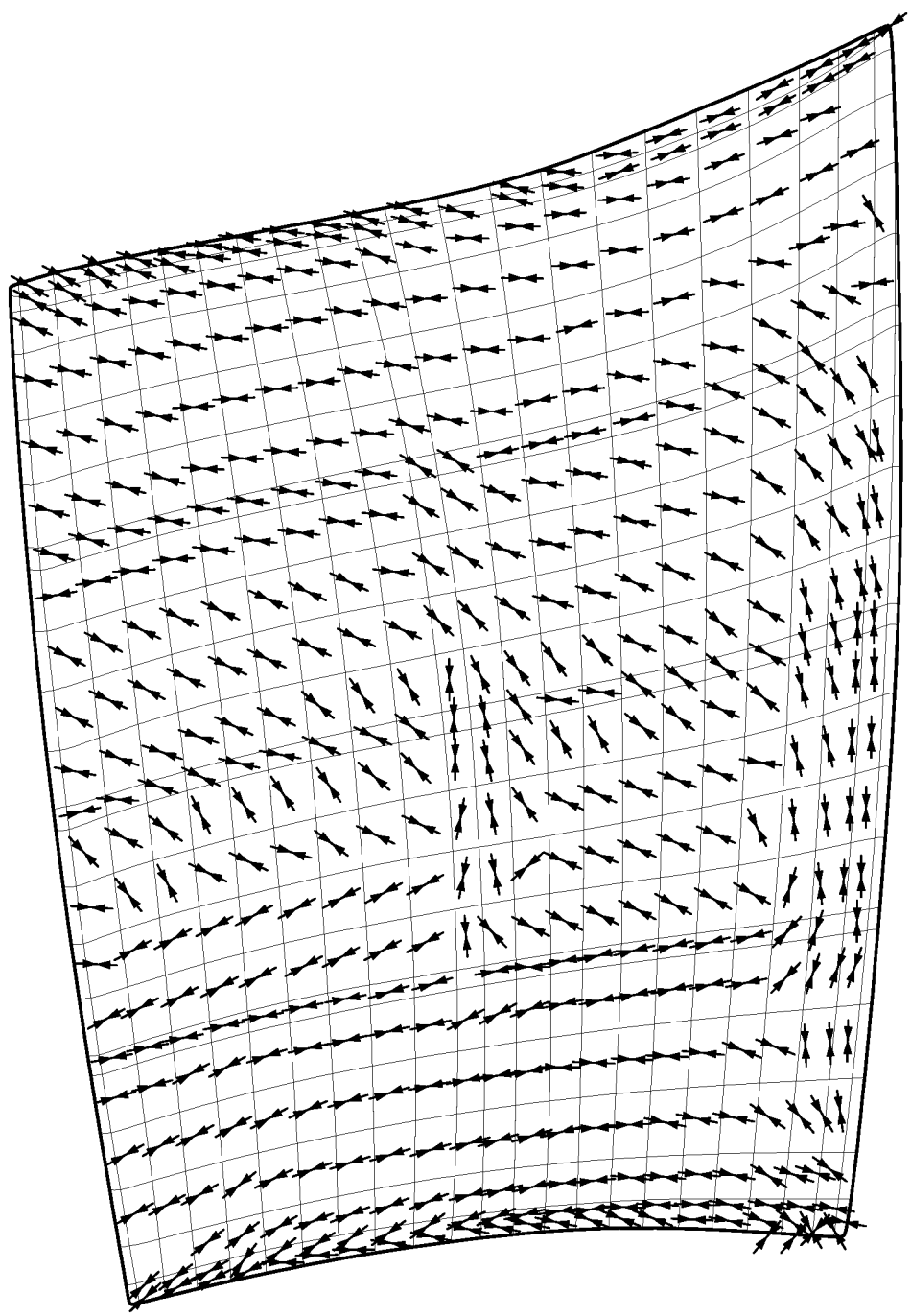

Returning briefly to FIG. 5, in a fourth step 320, critical locations of the modeled turbine airfoil component 200 are identified. FIGS. 9A and 9B are models showing the principle stresses during the transient thermal-stress analysis for each side of a first stator airfoil (e.g., first stator airfoil 210) during acceleration, and FIGS. 10A and 10B are models showing the principle stresses during the transient thermal-stress analysis for each side of a second stator airfoil (e.g., second stator airfoil 230) during acceleration. As shown in FIGS. 9A, 9B, 10A and 10B, the first and second stator airfoils 210, 230 have different stress profiles that should be individually and collectively addressed by a designer.

With reference again to FIG. 5, in a fifth step 325, the crystallographic orientation can be optimized to accommodate the stresses in the respective stator airfoils 210, 230. Particularly, the crystallographic orientation can be optimized with an understanding of the stress field in the respective airfoils and endwalls such that the single crystal material in one of the airfoils can be optimally oriented to minimize the overall thermal mechanical fatigue distress in that portion of the component 200, while also optimally orienting the single crystal material in the other airfoil to minimize the overall thermal mechanical fatigue distress in that portion of the component 200 and the component overall. In general, the optimization considers all potential crack and/or failure locations. Then, the various crystals orientations for each stator airfoil 210, 230 are modeled and evaluated based on predicted durability. The crystal orientations associated with the best overall component durability are then selected for fabrication of the component, which may include a casting process. Other fabrication techniques may also be utilized to achieve the desired crystal orientations.

In a sixth step 330, the turbine stator airfoil component 200 may be fabricated based on the modeled turbine component, including orienting crystallographic orientations based on the critical locations. In general, when using a casting fabrication process, a mold pattern may be assembled and a heat resistant ceramic shell may be deposited on the mold pattern. A number of seed crystals may be inserted into the casting mold. The seed crystals are oriented to define the desired primary and secondary crystallographic orientation of respective airfoils and endwall portions, which thus defines the tertiary orientation since it is orthogonal to both the primary and secondary orientations. For example, the first stator airfoil 210 may have first seed crystal to define first primary and secondary crystallographic orientations, and the second airfoil 230 may have a second seed crystal to define second primary and secondary crystallographic orientations. Particularly, the first and second airfoils have different crystallographic orientations relative to respective radial and axial directions. In other words, the crystallographic orientations are not merely clocked around a 360° ring, but have different primary and/or secondary orientations relative to one another.

A chill plate may also be coupled to the mold. The investment casting mold, containing the seed crystals and the attached chill plate, may be inserted into a mold heater, such as a furnace, which preheats the mold to a temperature above the liquidus temperature of the manufacturing material, with the exception of the portion containing the seed crystals, which is maintained at a temperature below the solidus temperature of the material. The material may be melted in a crucible to a temperature above the liquidus temperature of the material. The molten material may be cast into the mold by pouring molten material into the mold. After casting, the mold may be removed out of the mold heater, which may result in a moving thermal gradient that enables directional solidification of the casting. Directional solidification in the gradient may enable the seed crystals to grow into the mold cavities, resulting in the turbine stator airfoil component 200. The mold may then be removed and the turbine stator component may undergo any necessary processing to result in the finished turbine stator component 200.

Exemplary embodiments discussed herein may enable higher turbine engine temperatures than conventional engines, which may result in an improvement in specific fuel consumption. Alternatively, exemplary embodiments may double turbine stator durability at current temperatures. In general, the gas turbine engine assemblies produced according to exemplary embodiments may find beneficial use in many industries including aerospace, but also including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A turbine stator component, comprising:
a first endwall;
a second endwall;
a first stator airfoil coupled between the first and second endwalls, the first stator airfoil having first crystallographic primary and secondary orientations; and
a second stator airfoil adjacent to the first airfoil and coupled between the first and second endwalls, the second stator airfoil having second crystallographic primary and secondary orientations, the first crystallographic primary and secondary orientations being different from the second crystallographic primary and secondary orientations, wherein the first crystallographic primary and secondary orientations are different from the second crystallographic primary and secondary orientations relative to radial and axial directions of the turbine component.

2. The turbine stator component of claim 1, wherein the first and second stator airfoils form a doublet.

3. The turbine stator component of claim 1, wherein the first endwall, second endwall, first stator airfoil, and second stator airfoil form an integral component and are manufactured with a material having anisotropic properties.

4. The turbine stator component of claim 3, wherein the material is a nickel-based superalloy.

5. The turbine stator component of claim 1, wherein a first portion of the first endwall has the first crystallographic orientation and a second portion of the first endwall has a second crystallographic orientation, the first and second portions meeting at a first grain boundary, the first grain boundary being located in an area of relatively low stress.

6. The turbine stator component of claim 5, wherein the grain boundary mismatch provides acceptable material strength and component durability, where generally the mismatch is less than approximately 15°.

7. The turbine stator component of claim 1, further comprising three or more stator airfoils adjacent to the second airfoil and coupled between the first and second endwalls, the three or more stator airfoils having unique primary and secondary crystallographic orientations, the three or more primary and secondary crystallographic orientations being different from the first primary and secondary crystallographic orientations and the second primary and secondary crystallographic orientations.

8. The turbine stator component of claim 1, wherein the first stator airfoil additionally includes a first crystallographic tertiary orientation and the second stator airfoil additionally includes a second crystallographic tertiary orientation, and wherein the first crystallographic tertiary orientation is different from the second crystallographic tertiary orientation.

9. The turbine stator component of claim 1, wherein the first crystallographic primary and second orientations of the first stator airfoil are relative to a first coordinate system of axial, radial, and tangential directions associated with the first stator airfoil, the second crystallographic primary and second orientations of the second stator airfoil are relative to a second coordinate system of axial, radial, and tangential directions associated with the first stator airfoil, and the first crystallographic primary and secondary orientations with respect to the radial and axial directions of the first coordinate system have different values from the second crystallographic primary and secondary orientations relative to the radial and axial directions of the second coordinate system.

10. A turbine stator component, comprising:
   a first endwall;
   a second endwall;
   a first stator airfoil coupled between the first and second endwalls, the first stator airfoil having first primary and secondary crystallographic orientations; and
   a second stator airfoil adjacent to the first airfoil and coupled between the first and second endwalls such that the first and second airfoils form a doublet, the second stator airfoil having second primary and secondary crystallographic orientations, the first primary and secondary crystallographic orientations being different from the second primary and secondary crystallographic orientations.

11. The turbine stator component of claim 10, wherein the first stator airfoil additionally includes a first crystallographic tertiary orientation and the second stator airfoil additionally includes a second crystallographic tertiary orientation, and wherein the first crystallographic tertiary orientation is different from the second crystallographic tertiary orientation.

12. The turbine stator component of claim 10, wherein the first crystallographic primary and second orientations of the first stator airfoil are relative to a first coordinate system of axial, radial, and tangential directions associated with the first stator airfoil, the second crystallographic primary and second orientations of the second stator airfoil are relative to a second coordinate system of axial, radial, and tangential directions associated with the first stator airfoil, and the first crystallographic primary and secondary orientations with respect to the radial and axial directions of the first coordinate system have different values from the second crystallographic primary and secondary orientations relative to the radial and axial directions of the second coordinate system.

* * * * *